(12) United States Patent
Hwang et al.

(10) Patent No.: US 10,526,445 B2
(45) Date of Patent: Jan. 7, 2020

(54) COPOLYCARBONATE AND COMPOSITION COMPRISING THE SAME

(71) Applicant: LG CHEM, LTD., Seoul (KR)

(72) Inventors: Young Young Hwang, Daejeon (KR); Hyong Min Bahn, Daejeon (KR); Jung Jun Park, Daejeon (KR); Moo Ho Hong, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/528,061

(22) PCT Filed: Nov. 4, 2016

(86) PCT No.: PCT/KR2016/012677
§ 371 (c)(1),
(2) Date: May 18, 2017

(87) PCT Pub. No.: WO2017/078470
PCT Pub. Date: May 11, 2017

(65) Prior Publication Data
US 2018/0334537 A1 Nov. 22, 2018

(30) Foreign Application Priority Data
Nov. 6, 2015 (KR) .................. 10-2015-0156125

(51) Int. Cl.
C08G 64/18 (2006.01)
C08L 69/00 (2006.01)
C08G 77/448 (2006.01)
C08G 64/28 (2006.01)
B29C 45/00 (2006.01)
B29K 69/00 (2006.01)
B29K 105/00 (2006.01)

(52) U.S. Cl.
CPC .......... C08G 64/186 (2013.01); C08G 64/28 (2013.01); C08G 77/448 (2013.01); C08L 69/00 (2013.01); C08L 69/005 (2013.01); B29C 45/0001 (2013.01); B29K 2069/00 (2013.01); B29K 2105/0094 (2013.01); B29K 2995/0088 (2013.01); B29K 2995/0089 (2013.01); C08L 2205/025 (2013.01)

(58) Field of Classification Search
None
See application file for complete search history.

(56) References Cited

U.S. PATENT DOCUMENTS 5,530,083 A 6/1996 Phelps et al.
7,365,125 B2 4/2008 Govaerts et al.
7,709,562 B2 5/2010 Li et al.
2013/0261235 A1 10/2013 Minemura et al.
2013/0317148 A1 11/2013 Zheng et al.
2014/0256888 A1 9/2014 Ishikawa et al.
2014/0378710 A1 12/2014 Sakami et al.
2015/0183985 A1 7/2015 Hong et al.
2015/0315380 A1* 11/2015 Bahn .................. C08L 83/04
524/352
2016/0009919 A1 1/2016 Aoki
2016/0017102 A1* 1/2016 Yamada ............... C08G 64/186
528/29
2016/0083527 A1 3/2016 Mittal et al.
2018/0127542 A1* 5/2018 Yamada ................. C08G 64/18

FOREIGN PATENT DOCUMENTS

| EP | 2492315 A1 | 8/2012 |
| JP | 2014172938 A | 9/2014 |
| KR | 1020140118991 A | 10/2014 |
| WO | 2011013846 A1 | 2/2011 |
| WO | WO 2015/002427 | * 1/2015 |
| WO | WO-2015/087595 | * 6/2015 |
| WO | 2016159025 A1 | 1/2018 |

OTHER PUBLICATIONS

Japanese application 2015-070155 filed Mar. 30, 2015. No publication date. (Year: 000).*

* cited by examiner

Primary Examiner — David J Buttner
(74) Attorney, Agent, or Firm — Dentons US LLP

(57) ABSTRACT

The present disclosure relates to a copolycarbonate including repeating units of Chemical Formulas 1, 2 and 3; and a composition comprising the same:

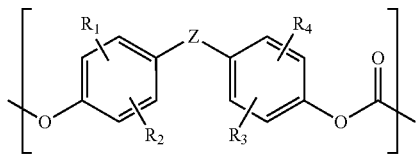

[Chemical Formula 1]

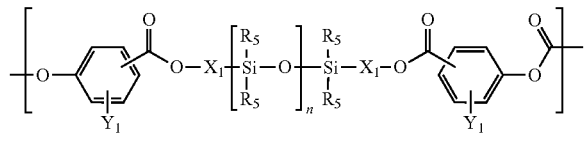

[Chemical Formula 2]

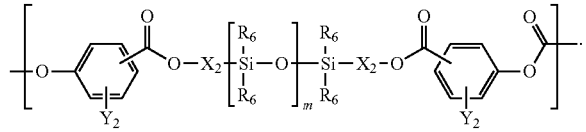

[Chemical Formula 3]

15 Claims, No Drawings

COPOLYCARBONATE AND COMPOSITION COMPRISING THE SAME

This application is a National Stage Application of International Application No. PCT/KR2016/012677, filed Nov. 4, 2016, and claims the benefit of Korean Patent Application No. 10-2015-0156125, filed Nov. 6, 2015, the contents of which are incorporated herein by reference in their entirety for all purposes as if fully set forth below.

CROSS-REFERENCE TO RELATED APPLICATION(S)

This application claims the benefit of Korean Patent Application No. 10-2015-0156125 filed on Nov. 6, 2015 with the Korean Intellectual Property Office, the disclosure of which is incorporated herein by reference in its entirety.

TECHNICAL FIELD

The present invention relates to a copolycarbonate and a composition comprising the same, and more specifically to a copolycarbonate being economically produced, and having improved impact strength at room temperature, impact strength at low-temperature and melt index, and to a composition comprising the same.

BACKGROUND OF ART

Polycarbonate resins are prepared by condensation-polymerization of an aromatic diol such as bisphenol A with a carbonate precursor such as a phosgene and have excellent impact strength, dimensional stability, heat resistance and transparency. Thus, the polycarbonate resins have application in a wide range of uses, such as exterior materials of electrical and electronic products, automobile parts, building materials, and optical components.

Recently, in order to apply these polycarbonate resins to more various fields, many studies have been made to obtain desired physical properties by copolymerzing two or more aromatic diol compounds having different structures from each other and introducing units having different structures in a main chain of the polycarbonate.

Especially, studies for introducing a polysiloxane structure in a main chain of the polycarbonate have been undergone, but most of these technologies have disadvantages in that production costs are high, and when chemical resistance or impact strength, particularly impact strength at low-temperature is increased, a melt index or the like is conversely lowered.

Given the above circumstances, the present inventors have conducted intensive studies to overcome the above-mentioned disadvantages encountered with the prior arts and develop a copolycarbonate having improved impact strength at room temperature, impact strength at low-temperature and melt index properties, and found that a copolycarbonate in which a specific siloxane compound is introduced in a main chain of the polycarbonate as described below satisfies the above-described properties. The present invention has been completed on the basis of such a finding.

DETAILED DESCRIPTION OF THE INVENTION

Technical Problem

It is an object of the present invention to provide a copolycarbonate having improved impact strength at room temperature, impact strength at low-temperature and melt index properties.

It is another object of the present invention to provide a polycarbonate composition comprising the above-mentioned copolycarbonate and polycarbonate.

It is a further object of the present invention to provide an article comprising the above copolycarbonate, or the above polycarbonate composition.

Technical Solution

In order to achieve these objects, the present invention provides a copolycarbonate comprising:
a repeating unit represented by the following Chemical Formula 1,
a repeating unit represented by the following Chemical Formula 2, and
a repeating unit represented by the following Chemical Formula 3,
wherein the copolycarbonate has a weight average molecular weight of 1,000 to 100,000 g/mol:

[Chemical Formula 1]

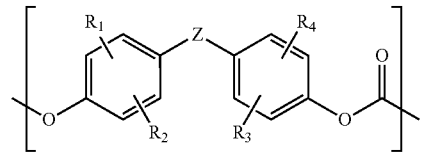

in the Chemical Formula 1,
$R_1$, $R_2$, $R_3$ and $R_4$ are each independently hydrogen, $C_{1-10}$ alkyl, $C_{1-10}$alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2]

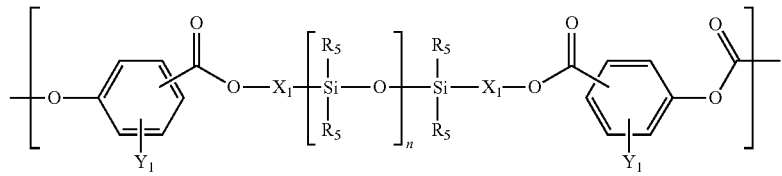

in the Chemical Formula 2,
each of $X_1$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl;
n is an integer of 1 to 40,

[Chemical Formula 3]

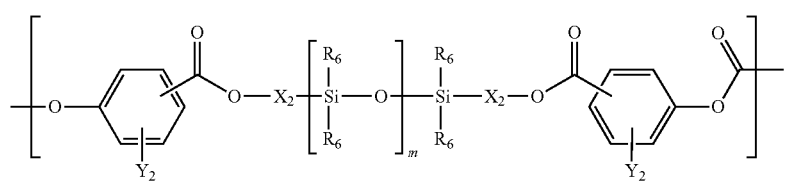

in the Chemical Formula 3,
each of $X_2$ is independently $C_{1-10}$ alkylene,
each of $Y_2$ is independently hydrogen, $C_{1-6}$ alkyl, halogen, hydroxyl, $C_{1-6}$ alkoxy, or $C_{6-20}$ aryl,
each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 41 to 200.

The copolycarbonate according to the present invention includes a polycarbonate structure formed of the repeating units represented by Chemical Formula 1. Generally, the polycarbonate has excellent overall mechanical and physical properties, but exhibits reduced impact strength at room temperature, impact strength at low-temperature and melt index properties. Therefore, in order to improve these properties, there is a need to introduce other structures in addition to the polycarbonate structure.

Accordingly, the copolycarbonate according to the present invention has a structure in which a polysiloxane formed of a repeating unit represented by Chemical Formula 2 and a repeating unit represented by Chemical Formula 3, in addition to the repeating unit represented by Chemical Formula 1, is copolymerized with a polycarbonate. Thus, the copolycarbonate has effects of significantly improving impact strength at room temperature, impact strength at low-temperature, and melt index properties, as compared with a conventional polycarbonate.

In particular, the repeating unit represented by Chemical Formula 2 and the repeating unit represented by Chemical Formula 3 include the numbers of repeating units (n and m) of the silicon oxide within each formula which numbers are different from each other. According to Examples and Comparative to be described later, it could be confirmed that a case of comprising both the repeating unit represented by Chemical Formula 2 and the repeating unit represented by Chemical Formula 3 exhibited significantly increased impact strength at room temperature, impact strength at low-temperature and melt index properties as compared with a case of comprising a single kind of repeating unit. This is because the improvement of physical properties results from the mutual complementary action by the respective repeating units.

Hereinafter, the present invention will be described in more detail.

Repeating Unit Resented by Chemical Formula 1

The repeating unit represented by Chemical Formula 1 is formed by reacting an aromatic diol compound with a carbonate precursor.

In Chemical Formula 1, preferably $R_1$, $R_2$, $R_3$ and $R_4$ are each independently hydrogen, methyl, chloro, or bromo.

Further, Z is preferably a linear or branched $C_{1-10}$ alkylene unsubstituted or substituted with phenyl, and more preferably methylene, ethane-1,1-diyl, propane-2,2-diyl, butane-2,2-diyl, 1-phenylethane-1,1-diyl, or diphenylmethylene. Further, preferably, Z is cyclohexane-1,1-diyl, O, S, SO, $SO_2$, or CO.

Preferably, the repeating unit represented by Chemical Formula 1 may be derived from one or more aromatic diol compounds selected from the group consisting of bis(4-hydroxyphenyl)methane, bis(4-hydroxyphenyl)ether, bis(4 hydroxyphenyl)sulfone, bis(4-hydroxyphenyl)sulfoxide, bis (4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl) propane, 2,2-bis(4-hydroxy-3,5-dimethylphenyl)propane, 1,1-bis(4-hydroxyphenyl)-1-phenylethane, bis(4 hydroxyphenyl)diphenylmethane, and α,ω-bis[3-(o-hydroxyphenyl) propyl]polydimethysiloxane.

As used herein, 'derived from aromatic did compounds' means that a hydroxy group of the aromatic diol compound and a carbonate precursor are reacted to form the repeating unit represented by Chemical Formula 1.

For example, when bisphenol A, which is an aromatic diol compound, and triphosgene, which is a carbonate precursor, are polymerized, the repeating unit represented by Chemical Formula 1 is represented by the following Chemical Formula 1-1:

[Chemical Formula 1-1]

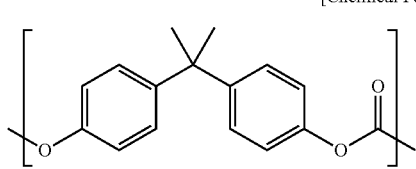

The carbonate precursor used herein may include one or more selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl)carbonate, phosgene, triphosgene, diphosgene, bromophosgene and bishaloformate. Preferably, triphosgene or phosgene may be used.

Repeating Unit Represented by Chemical Formula 2 and Repeating Unit Represented by Chemical Formula 3

The repeating unit represented by Chemical Formula 2 and the repeating unit represented by Chemical Formula 3 are formed by reacting a siloxane compound with a carbonate precursor, respectively.

In Chemical Formula 2, preferably each of $X_1$ is independently $C_{2-10}$ alkylene, more preferably $C_{2-6}$ alkylene, and most preferably isobutylene.

In addition, preferably, $Y_1$ is hydrogen.

Representative examples of Chemical Formula 2 are as follows:

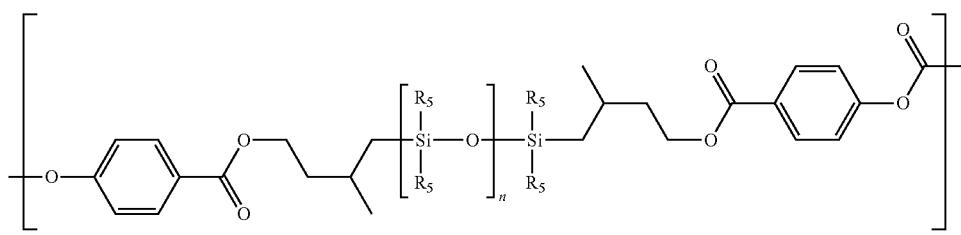
[Chemical Formula 2-1]

Also, preferably, each of $R_5$ represents independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. More preferably, each of $R_5$ represents independently $C_{1-10}$ alkyl, more preferably $C_{1-6}$ alkyl, still more preferably $C_{1-3}$ alkyl, and most preferably methyl.

In Chemical Formula 3, preferably each of $X_2$ is independently $C_{2-10}$ alkylene, more preferably $C_{2-6}$ alkylene, and most preferably isobutylene.

In addition, preferably, $Y_2$ is hydrogen.

Representative examples of Chemical Formula 3 are as follows:

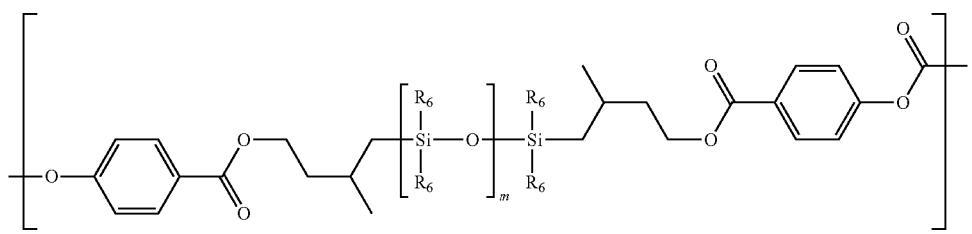
[Chemical Formula 3-1]

Also preferably, each of $R_6$ represents independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl, or naphthyl. More preferably, each of $R_6$ represents independently $C_{1-10}$ alkyl, more preferably $C_{1-6}$ alkyl, still more preferably $C_{1-3}$ alkyl, and most preferably methyl.

Also preferably, $X_1$ and $X_2$ are identical to each other. Further, preferably, $Y_1$ and $Y_2$ are identical to each other. In addition, preferably, $R_5$ and $R_6$ are identical to each other.

Also preferably, in Chemical Formula 2, n is an integer of not less than 10, not less than 15, not less than 20, or not less than 25; and not more than 35. Also preferably, in Chemical Formula 3, m is an integer of not less than 45, not less than 50, or not less than 55; and not more than 100, not more than 95, not more than 90, not more than 85, not more than 80, not more than 75, not more than 70, or not more than 65.

Preferably, the repeating unit represented by Chemical Formula 2 and the repeating unit represented by Chemical Formula 3 are derived from a siloxane compound represented by the following Chemical Formula 2-2 and a siloxane compound represented by the following Chemical Formula 3-2.

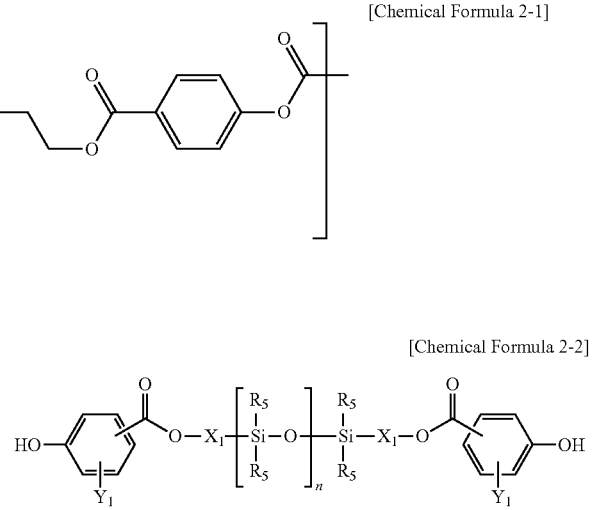
[Chemical Formula 2-2]

in the Chemical Formula 2-2,
$X_1$, $Y_1$, $R_5$ and n are as previously defined,

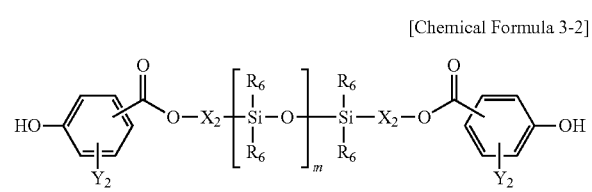
[Chemical Formula 3-2]

in the Chemical Formula 3-2,
$X_2$, $Y_2$, $R_6$ and m are as previously defined, As used herein, 'derived from a siloxane compound' means that a hydroxy group of the respective siloxane compound and a carbonate precursor are reacted to form the repeating unit represented by Chemical Formula 2 and the repeating unit represented by Chemical Formula 3. Further, the carbonate precursor that can be used for the formation of the repeating units represented by Chemical Formulae 2 and 3 is the same as the carbonate precursor that can be used for the formation of the repeating unit represented by Chemical Formula 1 described above.

The method for preparing the siloxane compound represented by Chemical Formula 2-2 and the siloxane compound represented by Chemical Formula 3-2 are as shown in the following Reaction Schemes 1 and 2, respectively.

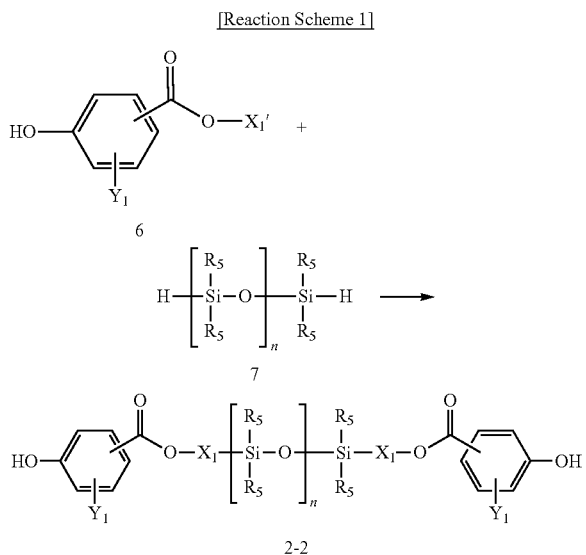

In Reaction Scheme 1,
$X_1'$ is $C_{2-10}$ alkenyl, $Y_1$, $R_5$ and n are as previously defined,

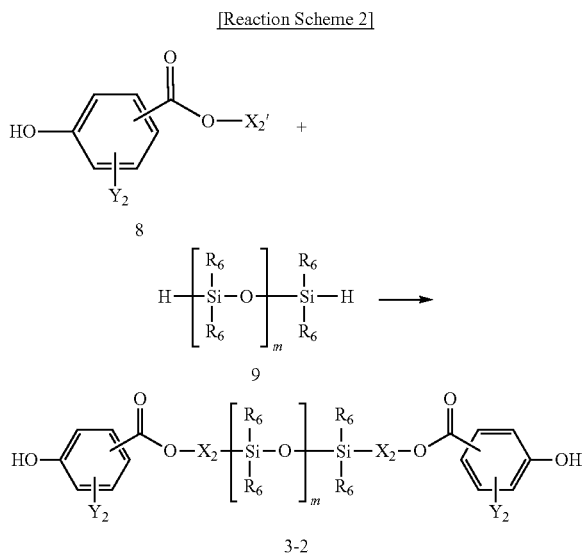

in Chemical Formula 2,
$X_2'$ is $C_{2-10}$ alkenyl, and $Y_2$, $R_6$ and m are as previously defined.

In Reaction Scheme 1 and Reaction Scheme 2, the reaction is preferably conducted in the presence of a metal catalyst. As the metal catalyst, a Pt catalyst is preferably used. The Pt catalyst used herein may include one or more selected from the group consisting of Ashby catalyst, Karstedt catalyst, Lamoreaux catalyst, Speier catalyst, $PtCl_2$ (COD), $PtCl_2$(benzonitile)$_2$, and $H_2PtBr_6$. The metal catalyst may be used in an amount of not less than 0.001 parts by weight, not less than 0.005 parts by weight, or not less than 0.01 parts by weight; and not more than 1 part by weight, not more than 0.1 part by weight, or not more than 0.05 part by weight, based on 100 parts by weight of the compounds represented by Chemical Formula 7 or 9.

Further, the above reaction temperature is preferably 80 to 100° C. Further, the above reaction time is preferably 1 to 5 hours.

In addition, the compounds represented by Chemical Formula 7 or 9 can be prepared by reacting an organodisiloxane and an organocydosiloxane in the presence of an acid catalyst, and n and m may be adjusted by adjusting the amount of the reactants used. The reaction temperature is preferably 50 to 70° C. Also, the reaction time is preferably 1 to 6 hours.

The above organodisiloxane may include one or more selected from the group consisting of tetramethyldisiloxane, tetraphenyldisiloxane, hexamethyldisiloxane and hexaphenyldisiloxane. In addition, the above organocydosiloxane may include, for example, organocycdotetrasiloxane. As one example thereof, octamethylcydotetrasiloxane and ocaphenyicycotetrasiloxane and the like can be included.

The above organodisiloxane can be used in an amount of not less than 0.1 parts by weight, or not less than 2 parts by weight; and not more than 10 parts by weight or not more than 8 parts by weight, based on 100 parts by weight of the organocyclosiloxane.

The above acid catalyst that may be used herein includes one or more selected from the group consisting of $H_2SO_4$, $HClO_4$, $AlCl_3$, $SbCl_5$, $SnCl_4$ and acid clay (fuller's earth). Further, the acid catalyst may be used in an amount of not less than 0.1 parts by weight, not less than 0.5 parts by weight, or not less than 1 part by weight; and not more than 10 parts by weight, not more than 5 parts by weight or not more than 3 parts by weight, based on 100 parts by weight of the organocyclosiloxane.

In particular, by adjusting the content of the repeating unit represented by Chemical Formulae 2 and the repeating unit represented by Chemical Formula 3, the impact strength at low-temperature and melt index of the copolycarbonate can be improved at the same time, and the weight ratio between the two or more kinds of repeating units may be 1:99 to 99:1, preferably 3-97 to 97.3, 5.95 to 95:5, 10.90 to 90:10, or 15:85 to 85:15, and more preferably 20:80 to 8020. The weight ratio of the above repeating units corresponds to the weight ratio of siloxane compounds, for example, the siloxane compound represented by Chemical Formula 2-2 and the siloxane compound represented by Chemical Formula 3-2.

Copolycarbonate

The copolycarbonate according to the present invention comprises the repeating units represented by Chemical Formulae 1 to 3. Preferably, the copolycarbonate is a random copolymer.

Also preferably, the copolycarbonate according to the present invention has a weight average molecular weight (g/mol) of 15,000 to 35,000. More preferably, the weight average molecular weight is not less than 20,000, not less than 21,000, not less than 22,000, not less than 23,000, not less than 24,000, not less than 25,000, not less than 26,000, not less than 27,000, or not less than 28,000. Further, the weight average molecular weight is not more than 34,000, not more than 33,000, not more than 32,000, not more than 31,000, or not more than 30,000.

The copolycarbonate according to the present invention has an impact strength at room temperature of not less than 500 J/m, not less than 510 J/m, not less than 520 J/m, not less than 530 J/m, not less than 540 J/m, not less than 550 J/m, not less than 560 J/m, not less than 570 J/m, or not less than 580 J/m, as measured at 23° C. in accordance with ASTM D256 (⅛ inch, Notched Izod). Further, the impact strength at room temperature is excellent as the value is higher. Thus, the upper limit thereof is not restricted, but as one example, it may be not more than 1000 J/m, not more than 950 J/m, not more than 900 J/m, or not more than 850 J/m.

Further, preferably, the copolycarbonate according to the present invention has an impact strength at low-temperature of not less than 300 J/m, not less than 350 J/m, not less than 400 J/m, not less than 410 J/m, not less than 420 J/m, not less than 430 J/m, or not less than 440 J/m, as measured at −30° C. in accordance with ASTM D256 (⅛ inch, Notched Izod). Further, the impact strength at low-temperature is more excellent as the value is higher. Thus, the upper limit thereof is not restricted, but as one example, it may be not more than 1000 J/m, not more than 950 J/m, not more than 900 J/m, or not more than 850 J/m.

Further, preferably, the above copolycarbonate has a melt index of 3 to 20 g/10 min, as measured in accordance with ASTM D1238 (conditions of 300° C. and 1.2 kg). More preferably, the melt index (g/10 min) is not less than 4, not less than 5, not less than 6, not less than 7, not less than 8, not less than 9, or not less than 10; and not more than 19, not more than 18, not more than 17, not more than 16, not more than 15, not more than 14, not more than 13, or not more than 12.

Further, the weight ratio between the weight of the repeating unit represented by Chemical Formula 1 and the total weight of the repeating unit represented by Chemical Formula 2 and the repeating unit represented by Chemical Formula 3 (Chemical Formula 1:(Chemical Formula 2+Chemical Formula 3)) is preferably 1:0.04-0.07.

The copolycarbonate according to the present invention can be prepared by the preparation method comprising a step of polymerizing a composition comprising the aromatic diol compound, the compound represented by Chemical Formula 2-2, the compound represented by Chemical Formula 3-2, and the carbonate precursor.

During the polymerization, the total weight of the compound represented by Chemical Formula 2-2 and the compound represented by Chemical Formula 3-2 is preferably not less than 0.1% by weight, not less than 0.5% by weight, not less than 1% by weight, or not less than 1.5% by weight; and not more than 20% by weight, not more than 10% by weight, not more than 7% by weight, not more than 5% by weight, or not more than 4% by weight, based on 100% by weight of the composition.

Further, the aromatic diol compound can be used in an amount of not less than 40% by weight, not less than 50% by weight, or not less than 55% by weight; and not more than 80% by weight, not more than 70% by weight, or not more than 65% by weight, based on 100% by weight of the composition.

Further, the carbonate precursor can be used in an amount of not less than 10% by weight, not less than 20% by weight, or not less than 30% by weight; and not more than 60% by weight, not more than 50% by weight, or not more than 40% by weight, based on 100% by weight of the composition.

Further, as the polymerization method, an interfacial polymerization method can be used as one example. In this case, there is an advantage in that the polymerization reaction can be made at low temperature and atmospheric pressure, and it is easy to adjust the molecular weight. The above interfacial polymerization is preferably conducted in the presence of an acid binder and an organic solvent. Furthermore, the above interfacial polymerization may comprise, for example, the steps of conducting pre-polymerization, then adding a coupling agent and again conducting polymerization. In this case, the copolycarbonate having a high molecular weight can be obtained.

The materials used in the interfacial polymerization are not particularly limited as long as they can be used in the polymerization of polycarbonates. The used amount thereof may be controlled as required.

The acid binding agent may include, for example, alkali metal hydroxides such as sodium hydroxide or potassium hydroxide, or amine compounds such as pyridine.

The organic solvent is not particularly limited as long as it is a solvent that can be usually used in the polymerization of polycarbonate. As one example, halogenated hydrocarbon such as methylene chloride or chlorobenzene can be used.

Further, during the interfacial polymerization, a reaction accelerator, for example, a tertiary amine compound such as triethylamine, tetra-n-butyl ammonium bromide and tetra-n-butylphosphonium bromide or a quaternary ammonium compound or a quaternary phosphonium compound may be further used for accelerating the reaction.

In the interfacial polymerization, the reaction temperature is preferably from 0 to 40° C., and the reaction time is preferably from 10 minutes to 5 hours. Further, during the interfacial polymerization reaction, pH is preferably maintained at 9 or more, or 11 or more.

In addition, the interfacial polymerization may be conducted by further comprising a molecular weight modifier. The molecular weight modifier may be added before the initiation of polymerization, during the initiation of polymerization, or after the initiation of polymerization.

As the above molecular weight modifier, mono-alkylphenol may be used. As one example, the mono-alkylphenol is one or more selected from the group consisting of p-tert-butylphenol, p-cumyl phenol, decyl phenol, dodecyl phenol, tetradecyl phenol, hexadecyl phenol, octadecyl phenol, eicosyl phenol, docosyl phenol and triacontyl phenol, and preferably p-tert-butylphenol. In this case, the effect of adjusting the molecular weight is great.

The above molecular weight modifier is contained, for example, in an amount of not less than 0.01 parts by weight, not less than 0.1 parts by weight, or not less than 1 part by weight; and not more than 10 parts by weight, not more than 6 parts by weight, or not more than 5 parts by weight, based on 100 parts by weight of the aromatic diol compound. Within this range, the required molecular weight can be obtained.

Polycarbonate Composition

In addition, the present invention provides a polycarbonate composition comprising the above-mentioned copolycarbonate and polycarbonate. The copolycarbonate may be used alone, but it can be used together with the polycarbonate as needed to control the physical properties of the copolycarbonate.

The above polycarbonate is distinguished from the copolycarbonate according to the present invention in that a polysiloxane structure is not introduced in a main chain of the polycarbonate.

Preferably, the above polycarbonate comprises a repeating unit represented by the following Chemical Formula 4:

[Chemical Formula 4]

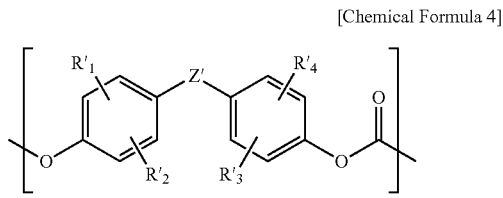

in the above Formula 4, $R'_1$, $R'_2$, $R_3$ and $R_4$ are each independently hydrogen, $C_{1-10}$ alkyl, $C_{1-10}$ alkoxy or halogen, and Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Further, preferably, the above polycarbonate has a weight average molecular weight of 15,000 to 35,000 g/mol. More preferably, the above weight average molecular weight (g/mol) is not less than 20,000, not less than 21,000, not less than 22,000, not less than 23,000, not less than 24,000, not less than 25,000, not less than 26,000, not less than 27,000, or not less than 28,000. Further, the above weight average molecular weight is not more than 34,000, not more than 33,000, or not more than 32,000.

The repeating unit represented by Chemical Formula 4 is formed by reacting the aromatic diol compound and the carbonate precursor. The aromatic diol compound and the carbonate precursor that can be used herein are the same as previously described for the repeating unit represented by Chemical Formula 1.

Preferably, $R'_1$, $R'_2$, $R'_3$, $R_4$ and Z in Chemical Formula 4 are the same as previously described for $R_1$, $R_2$, $R_3$, $R_4$ and Z in Chemical Formula 1, respectively.

Further, preferably, the repeating unit represented by Chemical Formula 4 is represented by the following Chemical Formula 4-1:

[Chemical Formula 4-1]

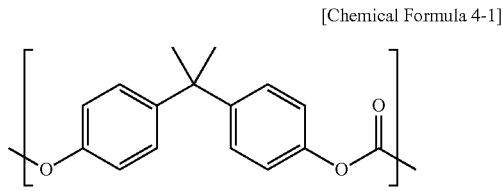

In the polycarbonate composition, the weight ratio of the copolycarbonate and the polycarbonate is preferably from 99:1 to 1:99, more preferably from 90:10 to 50:50, and most preferably from 20:80 to 8020.

In addition, the present invention provides an article comprising the above-mentioned copolycarbonate or the polycarbonate composition.

Preferably, the above article is an injection molded article. In addition, the article may further include, for example, one or more selected from the group consisting of antioxidants, heat stabilizers, light stabilizers, plasticizers, antistatic agents, nucleating agents, flame retardants, lubricants, impact reinforcing agents, fluorescent brightening agents, ultraviolet absorbers, pigments and dyes.

The method for preparing the article may include the steps of mixing the copolycarbonate according to the present invention and additives such as antioxidants using a mixer, extrusion-molding the mixture with an extruder to produce a pellet, drying the pellet and then injecting the dried pellet with an injection molding machine.

Advantageous Effects

As set forth above, according to the present invention, the copolycarbonate in which a specific siloxane compound is introduced in a main chain of the polycarbonate has an effect of improving impact strength at room temperature, impact strength at low-temperature and melt index properties.

DETAILED DESCRIPTION OF THE EMBODIMENTS

Below, preferred embodiments will be provided in order to assist in the understanding of the present disclosure. However, these examples are provided only for illustration of the present invention, and should not be construed as limiting the present invention to these examples.

Preparation Example 1: Preparation of Polyorganosiloxane (MB-30)

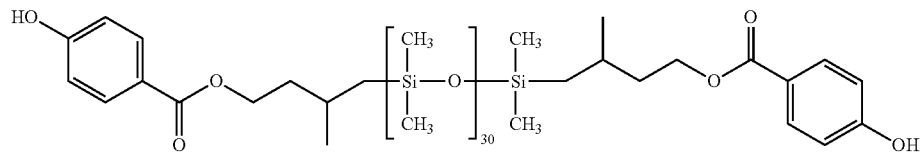

42.5 g (142.8 mmol) of octamethylcylotetrasiloxane and 2.26 g (16.8 mmol) of tetramethyldisiloxane were mixed. The mixture was then placed in 3 L flask together with 1 part by weight of an acid day (DC-A3) compared to 100 parts by weight of octamethylcyclotetrasiloxane, and reacted at 60° C. for 4 hours. After completion of the reaction, the reaction product was diluted with ethyl acetate and quickly filtered using a celite. The repeating unit(n) of the unmodified polyorganosiloxane thus prepared was 30 when confirmed through $^1$H NMR.

To the resulting terminal-unmodified polyorganosiloxane, 14.7 g (71.3 mmol) of 3-methylbut-3-enyl 4-hydroxybenzoate and 0.01 g (50 ppm) of Karstedt's platinum catalyst were added and reacted at 90'C for 3 hours. After completion of the reaction, the unreacted polyorganosiloxane was removed by conducting evaporation under the conditions of 120° C. and 1 torr. The terminal-modified polyorganosiloxane thus prepared was a pale yellow oil, the repeating unit(n) was 30, and further purification was not required. The preparation thereof was confirmed through $^1$H NMR and this was designated as MB-30.

Preparation Example 2: Preparation of Polyorganosiloxane (MB-60)

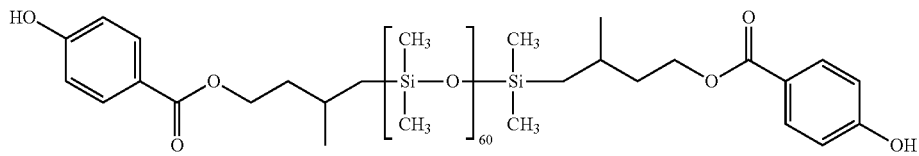

57.5 g (193.2 mmol) of octamethylcylotetrasiloxane and 2.26 g (16.8 mmol) of tetramethyldisiloxane were mixed. The mixture was then introduced in 3 L flask together with 1 part by weight of an acid day (DC-A3) relative to 100 parts by weight of octamethylcyclotetrasiloxane, and reacted at 60° C. for 4 hours. After completion of the reaction, the reaction product was diluted with ethyl acetate and quickly filtered using a celite. The repeating unit (m) of the unmodified polyorganosiloxane thus prepared was 60 when confirmed through $^1$H NMR.

To the resulting terminal-unmodified polyorganosiloxane, 10.8 g of 3-methylbut-3-enyl 4-hydroxybenzoate and 0.01 g (50 ppm) of Karstedt's platinum catalyst were added and reacted at 90° C. for 3 hours. After completion of the reaction, the unreacted polyorganosiloxane was removed by conducting evaporation under the conditions of 120° C. and 1 torr. The terminal-modified polyorganosiloxane thus prepared was pale yellow oil, the repeating unit (m) was 60, and further purification was not required. The preparation thereof was confirmed through $^1$H NMR and this was designated as MB-60.

Example 1

1) Preparation of Copolycarbonate Resin 978.4 g of Bisphenol A (BPA), 1,620 g of NaOH 32% aqueous solution, and 7,500 g of distilled water were added to 20 L glass reactor. After confirming that BPA was completely dissolved under nitrogen atmosphere, 3,670 g of methylene chloride, 18.3 g of p-tert-butylphenol, and 55.2 g of polyorganosiloxane previously prepared (mixture of 80 wt. % of polyorganosiloxane (MB-30) of Preparation Example 1 and 20 wt. % of polyorganosiloxane (MB-60) of Preparation Example 2) were added and mixed. To this mixture, 3,850 g of methylene chloride in which 542.5 g of triphosgene was dissolved was added dropwise for one hour. At this time, a NaOH aqueous solution was maintained at pH 12. After completion of the dropwise addition, the reaction product was aged for 15 minutes, and 195.7 g of triethylamine was dissolved in methylene chloride and added. After 10 minutes, pH was adjusted to 3 with 1N aqueous hydrochloric acid solution and then washed three times with distilled water. Subsequently, the methylene chloride phase was separated, and then precipitated in methanol to give a copolycarbonate resin in the form of a powder. The molecular weight of the resulting copolycarbonate resin was measured by GPC using PC Standard and the result confirmed that the weight average molecular weight was 27,700 g/mol.

2) Preparation of Injection Specimen

To the copolycarbonate resin prepared above, 0.050 parts by weight of tris(2,4-di-tert-butylphenyl)phosphite, 0.010 parts by weight of octadecyl-3-(3,5-di-tert-butyl-4-hydroxyphenyl)propionate, and 0.030 parts by weight of pentaerythritoltetrastearate were added, and the resulting mixture was pelletized using a φ30 mm twin screw extruder equipped with a vent. Thereafter, a specimen was subjected to an injection molding at a cylinder temperature of 300° C. and a mold temperature of 80'C using an injection molding machine N-20C (manufactured by JSW, Ltd.)

Example 2

The copolycarbonate resin and its injection-molded specimen were prepared in the same method as in Example 1, except that 55.2 g of polyorganosiloxane (mixture of 20 wt/o of polyorganosiloxane (MB-30) of Preparation Example 1 and 80 wt/o of polyorganosiloxane (MB-60) of Preparation Example 2) was used.

Comparative Example 1

The copolycarbonate resin and its injection-molded specimen were prepared in the same method as in Example 1, except that 55.2 g of polyorganosiloxane (100 wt % of polyorganosiloxane (MB-30) of Preparation Example 1) was used.

Comparative Example 2

The copolycarbonate resin and its injection-molded specimen were prepared in the same method as in Example 1, except that 55.2 g of polyorganosiloxane (100 wt % of polyorganosiloxane (MB-60) of Preparation Example 2) was used.

Comparative Example 3

The polycarbonate resin and its injection-molded specimen were prepared in the same method as in Example 1, except that polyorganosiloxane was not used.

Experimental Example: Evaluation of Physical Properties

The physical properties of the copolycarbonate specimens prepared in Examples and of the polycarbonate specimens prepared in Comparative Examples were determined in the following manner and the results were shown in Table 1 below.

- Weight average molecular weight (g/mol): measured by PC Standard using Agent 1200 series.
- Melt Index (MI): measured in accordance with ASTM D 1238 (conditions of 300° C. and 1.2 kg).
- Impact strength at room temperature and impact strength at low temperature (J/m): measured at 23° C. and −30° C. in accordance with ASTM D256 (⅛ inch, Notched Izod).
- Repeating unit: determined by $^1$H-NMR using Varian 500 MHz.

TABLE 1

| | Impact strength at room temperature (23° C., J/m) | Impact strength at low-temperature (−30° C., J/m) | Melt index (MI) (g/10 min) | Weight average molecular weight (Mw, g/mol) |
|---|---|---|---|---|
| Example 1 | 586 | 432 | 12 | 27,700 |
| Example 2 | 525 | 446 | 10 | 28,600 |
| Comparative Example 1 | 443 | 219 | 13 | 26,300 |
| Comparative Example 2 | 486 | 308 | 9 | 27,800 |
| Comparative Example 3 | 660 | 116 | 14 | 27,500 |

The invention claimed is:

1. A copolycarbonate comprising:
a repeating unit represented by the following Chemical Formula 1,
a repeating unit derived from a siloxane compound represented by the following Chemical Formula 2-2, and
a repeating unit derived from a siloxane compound represented by the following Chemical Formula 3-2,
wherein the copolycarbonate has a weight average molecular weight of 1,000 to 100,000 g/mol,
wherein a weight ratio between the repeating unit derived from a siloxane compound represented by Chemical Formula 2-2 and the repeating unit derived from a siloxane compound represented by Chemical Formula 3-2 is 20:80 to 80:20:

[Chemical Formula 1]

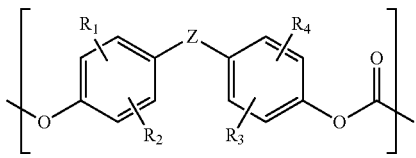

in the Chemical Formula 1,
$R_1$, $R_2$, $R_3$ and $R_4$ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO,

[Chemical Formula 2-2]

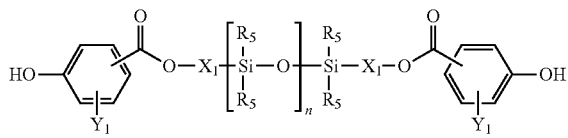

wherein in the Chemical Formula 2-2,
each of $X_1$ is independently $C_{1-10}$ alkylene,
each of $Y_1$ is independently hydrogen, $C_{1-6}$ alkyl, halogen, hydroxy, $C_{1-6}$ alkoxy, or $C_{6-20}$ aryl,
each of $R_5$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl;
n is an integer of 1 to 35,

[Chemical Formula 3-2]

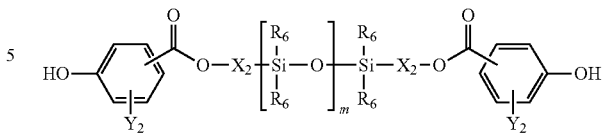

wherein in the Chemical Formula 3-2,
each of $X_2$ is independently $C_{1-10}$ alkylene,
each of $Y_2$ is independently hydrogen, $C_{1-6}$ alkyl, halogen, hydroxyl, $C_{1-6}$ alkoxy or $C_{6-20}$ aryl,
each of $R_6$ is independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
m is an integer of 50 to 200.

2. The copolycarbonate according to claim 1, wherein the repeating unit represented by Chemical Formula 1 is derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, and bis(4-hydroxyphenyl)diphenylmethane.

3. The copolycarbonate according to claim 1, wherein the repeating unit represented by Chemical Formula 1 is represented by the following Chemical Formula 1-1:

[Chemical Formula 1-1]

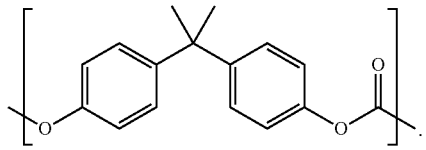

4. The copolycarbonate according to claim 1, wherein each of $X_1$ is independently $C_{2-6}$ alkylene.

5. The copolycarbonate according to claim 1, wherein each of $X_2$ is independently $C_{2-6}$ alkylene.

6. The copolycarbonate according to claim 1, wherein each of $R_5$ is independently $C_{1-6}$ alkyl.

7. The copolycarbonate according to claim 1, wherein each of $R_6$ is independently $C_{1-6}$ alkyl.

8. The copolycarbonate according to claim 1, wherein $R_5$ and $R_6$ are identical to each other.

9. The copolycarbonate according to claim 1, wherein n is an integer of 10 to 35.

10. The copolycarbonate according to claim 1, wherein m is an integer of 50 to 100.

11. The copolycarbonate according to claim 1, wherein the copolycarbonate has a weight average molecular weight of 15,000 to 35,000 g/mol.

12. A polycarbonate composition comprising the copolycarbonate of claim 1, and a polycarbonate.

13. The polycarbonate resin composition according to claim 12, wherein the polycarbonate comprises a repeating unit represented by the following Chemical Formula 4:

[Chemical Formula 4]

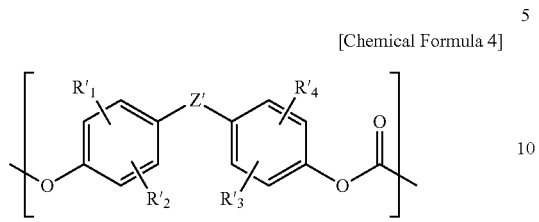

in the Chemical Formula 4, $R'_1$, $R'_2$, $R'_3$ and $R'_4$ are each independently hydrogen, $C_{1-10}$ alkyl, $C_{1-10}$ alkoxy, or halogen, and Z' is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

14. The polycarbonate resin composition according to claim 12, wherein a weight ratio of the copolycarbonate and the polycarbonate is from 99:1 to 1:99.

15. The polycarbonate resin composition according to claim 12, wherein a polysiloxane structure is not introduced in a main chain of the polycarbonate.

* * * * *